United States Patent
Shikama et al.

(10) Patent No.: US 12,521,372 B2
(45) Date of Patent: Jan. 13, 2026

(54) ANTIMICROBIAL AGENT FOR NON-HUMAN ANIMAL

(71) Applicant: ISHIHARA SANGYO KAISHA, LTD., Osaka (JP)

(72) Inventors: Hiroshi Shikama, Osaka (JP); Koji Higuchi, Osaka (JP); Shogo Atsumi, Osaka (JP); Takayuki Imura, Osaka (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 566 days.

(21) Appl. No.: 18/000,424

(22) PCT Filed: Jun. 2, 2021

(86) PCT No.: PCT/JP2021/021058
§ 371 (c)(1),
(2) Date: Dec. 1, 2022

(87) PCT Pub. No.: WO2021/246453
PCT Pub. Date: Dec. 9, 2021

(65) Prior Publication Data
US 2023/0255939 A1    Aug. 17, 2023

(30) Foreign Application Priority Data
Jun. 3, 2020    (JP) .................. 2020-097170

(51) Int. Cl.
A61K 31/4164    (2006.01)
A61P 31/04      (2006.01)
A61P 31/10      (2006.01)

(52) U.S. Cl.
CPC .......... *A61K 31/4164* (2013.01); *A61P 31/04* (2018.01); *A61P 31/10* (2018.01)

(58) Field of Classification Search
CPC .................................................. A61K 31/4164
USPC ........................................................ 514/400
See application file for complete search history.

(56) References Cited

U.S. PATENT DOCUMENTS

| | | | |
|---|---|---|---|
| 4,995,898 A * | 2/1991 | Nasu ...................... | A01N 55/00 544/58.4 |
| 5,045,557 A | 9/1991 | Buss et al. | |
| 2003/0100586 A1 | 5/2003 | Morino et al. | |
| 2004/0014782 A1 | 1/2004 | Krause | |
| 2005/0260711 A1 * | 11/2005 | Datta ...................... | C07K 16/32 536/23.53 |
| 2011/0028419 A1 | 2/2011 | Mitani et al. | |
| 2011/0104186 A1 | 5/2011 | Valiante et al. | |

FOREIGN PATENT DOCUMENTS

| | | |
|---|---|---|
| CN | 101151032 A | 3/2008 |
| CN | 102119150 A | 7/2011 |
| CN | 110337434 A | 10/2019 |
| EP | 0298196 A1 | 1/1989 |
| EP | 1211245 A1 | 6/2002 |
| EP | 4162938 A1 | 4/2023 |
| JP | S63255269 A | 10/1988 |
| JP | H01-131163 A | 5/1989 |
| JP | H8-225539 A | 9/1996 |
| JP | H18-283243 A | 10/1996 |
| JP | 2001-122781 A | 5/2001 |
| JP | 2002193710 A | 7/2002 |
| JP | 2010-1283 A | 1/2010 |
| JP | 2020508324 A | 3/2020 |
| PH | 26182 A | 3/1992 |
| WO | 2001/014341 A1 | 3/2001 |
| WO | 20090282727 A1 * | 3/2009 |
| WO | 2012125151 A1 | 9/2012 |
| WO | 2020262648 A1 * | 12/2020 |
| WO | 2023106320 A1 | 6/2023 |

OTHER PUBLICATIONS

Wang et al., J Org Chem (2019) 84(22): 14593- 601.*
Logvinenko et al., J Thermal Ana & Calorimetry (2020) 140(2): 68-93 .*
Pang et al., J Sci of Food & Agric (2019), 99(14): 6167-72.*
Huang et al., Separation & Purification Tech (2019) 211: 269-78.*
Magdolen et al., Hel Chim Acta (2005) 88(9): 2454-69.*
All the registry compounds are filed by applicant.*
Mitani et al. "The Biochemical Mode of Action of the Novel Selective Fungicide Cyazofamid: Specific Inhibition of Mitochondrial Complex III in Phythium spinosum" Pesticide Biochemistry and Physiology 71, 107-115 (2001).
Aug. 3, 2021 (WO) International Search Report PCT/JP2021/021058.
Jan. 18, 2024 (CN) Chinese Office Action of Jan. 18, 2024, with a machine translation into English.
"STN-registry", Dec. 31, 2017, STN-registry, pp. 1-5.
Kongquan Hu et al., Synthesis of Selonsertib, Shandong Chemical Industry, vol. 48, No. 17, Dec. 31, 2019, pp. 48-53, with an English abstract.

(Continued)

*Primary Examiner* — Taofiq A Solola
(74) *Attorney, Agent, or Firm* — Banner & Witcoff, Ltd.

(57) ABSTRACT

A novel antimicrobial agent is provided, and a compound represented by formula (I) or (II) or a salt thereof is used as an antimicrobial agent for a non-human animal.

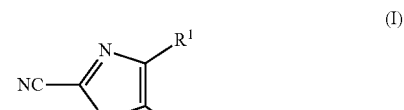

(I)

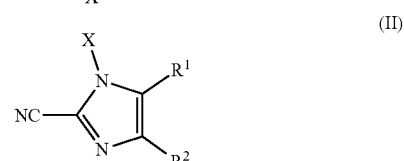

(II)

12 Claims, No Drawings

(56) References Cited

OTHER PUBLICATIONS

Han Shuaibing et al., "International Journal of Environmental Analytical Chemistry", vol. 103, No. 20, Residue dissipation and dietary risk assessment of cyazofamid and its metabolite CCIM in garlic, garlic bolt and garlic sprout, pp. 8914-8927.
2024 Sep. 13 (VN) Office Action Application No. 1-2022-08573.
Dec. 15, 2022 (WO) International Preliminary Report on Patentability PCT/JP2021/021058.
May 27, 2024 (EP) Extended European Search Report Application No. 21816659.3.
Nov. 27, 2024 (RU) Office Action Applicaiton No. 2022134431.
Apr. 4, 2025 (RU) Office Action Applicaiton No. 2022134431.
Jun. 25, 2025—(VN) Office Action—App. No. 1-2022-08573 w/ Eng. translation.
Aug. 5, 2025—(JP) Office Action—App. No. 2022-528874 w/ Eng. translation.
May 27, 2025 (TW) Office Action Patent Application No. 110120158.

\* cited by examiner

ANTIMICROBIAL AGENT FOR NON-HUMAN ANIMAL

CROSS-REFERENCE TO RELATED APPLICATION

The present patent application claims priority based on Japanese Patent Application No. 2020-097170 filed on Jun. 3, 2020, and the contents of this prior patent application are incorporated herein by reference in its entirety.

TECHNICAL FIELD

The present disclosure relates to an antimicrobial agent for a non-human animal.

BACKGROUND ART

A microbe belonging to the genus *Malassezia* is a basidiomycetous yeast that resides in the skin of an animal, and the microbe proliferates using a lipid as a nutrient source and thus settles in an area having a lot of sebum and is known to cause a skin disease such as tinea versicolor, seborrheic dermatitis, folliculitis, atopic dermatitis, or psoriasis vulgaris.

Examples of a conventional therapeutic agent for a skin disease derived from a microbe belonging to the genus *Malassezia* include selenium disulfide, zinc 2-mercaptopyridine N-oxide, piroctone olamine, an imidazole-based compound such as miconazole nitrate or ketoconazole, and a triazole-based compound such as itraconazole or fluconazole.

Usually, a normal skin inhabitant has a so-called barrier effect such as the effect of preventing the scalp odor associated with the growth of various germs on the skin or the effect of keeping a weakly acidic state by moderately degrading sebum, but a conventional therapeutic agent for an animal kills not only a pathogenic microbe but also a normal skin inhabitant, and thus there is a concern that the barrier effect of the skin may be destroyed. Further, it has been pointed out that selenium disulfide has a side effect such as oral toxicity, hair loss, skin irritation, debility, malaise, or discoloration of hair, and zinc 2-mercaptopyridine N-oxide has a concern about a sulfurous odor or an endocrine disruptor. Further, an imidazole-based compound such as miconazole nitrate and a triazole compound such as itraconazole have the action of inhibiting the lipid synthesis of a microbe, but because of the property of developing antimicrobial activity by inhibiting the biosynthesis of the cell membrane of a microbe, these compounds take time to develop a sufficient effect and need to be administered for a long period of time. It is known that consecutive administration of the same agent over a long period of time greatly increases the risk of developing a resistant microbe.

As described above, a lipid synthesis inhibitor does not immediately develop antimicrobial activity even when this agent is administered, and thus is not suitable for an administration method that requires immediate onset of antimicrobial activity, for example, the prevention or the treatment of an animal skin disease using a medical shampoo. Therefore, there has been a demand for the development of a therapeutic agent for an animal, which is highly safe, has a mechanism of action different from that of a conventional therapeutic agent, and exerts antimicrobial activity immediately.

For example, Non-Patent Document 1 discloses that the mechanism of action of cyazofamid, which is a cyanoimidazole-based compound, is respiratory inhibition.

Patent Document 1 discloses that an imidazole-based compound including cyazofamid is useful as a pest control agent, and Patent Document 2 discloses that a control agent containing an imidazole-based compound including cyazofamid as an active component is useful against an animal disease derived from a parasite, for example a parasite such as a coccidium. However, these publications do not disclose the antimicrobial activity of the compounds or a method for suppressing an animal skin disease derived from a microbe belonging to the genus *Malassezia*.

PRIOR ART

Patent Document 1: Japanese Patent Laid-Open No. H1-131163
Patent Document 2: International Publication No. WO 01/14341
Non-Patent Document 1: Pesticide Biochemistry and Physiology, 2001, vol. 71:107-115

SUMMARY OF THE INVENTION

The present disclosers have found that a cyanoimidazole-based compound represented by formula (I) or (II) described later (hereinafter, also referred to as a compound of the present disclosure) can be used as a novel antimicrobial agent for a non-human animal.

Therefore, the present disclosure provides a novel antimicrobial agent for a non-human animal.

That is, the present disclosure provides an antimicrobial agent for a non-human animal comprising a compound represented by formula (I) or (II) or a salt thereof.

[Formula 1]

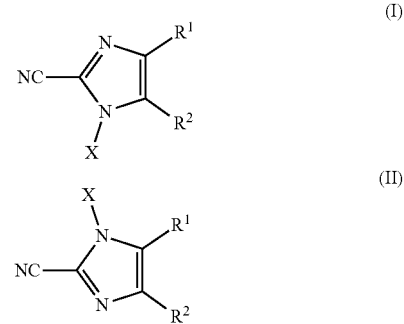

wherein
$R^1$ and $R^2$ are each independently
a hydrogen atom,
a halogen atom,
a hydroxyl group,
a nitro group,
a cyano group,
a thiocyanate group,
a trimethylsilyl group,
an optionally substituted alkyl group,
an optionally substituted alkenyl group,
an optionally substituted alkynyl group,
an optionally substituted alkyloxy group,
an optionally substituted alkenyloxy group, an optionally substituted alkynyloxy group,
an optionally substituted aryl group,
an optionally substituted aryloxy group,
an optionally substituted 5- or 6-membered aromatic heterocyclic group,
—SO$_m$R$^3$
wherein R$^3$ is an optionally substituted alkyl group, an optionally substituted alkenyl group, an optionally substituted alkynyl group,
an optionally substituted aryl group, an optionally substituted 5- or 6-membered aromatic heterocyclic group, or a —NR$^4$R$^5$ group wherein R$^4$ and R$^5$ are each an optionally substituted alkyl group, and m is an integer of 0 to 2, or
a group represented by

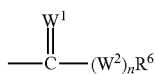

[Formula 2]

wherein
W$^1$ is an oxygen atom or a sulfur atom,
W$^2$ is an oxygen atom, a sulfur atom, or —NH—
n is an integer of 0 or 1,
R$^6$ is an optionally substituted alkyl group or an optionally substituted aryl group;
X is a hydrogen atom, a hydroxyl group, or —OY; and
Y is a formula:

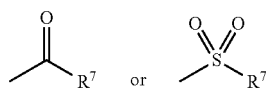

[Formula 3]

wherein
R$^7$ is an optionally substituted alkyl group,
an optionally substituted alkyloxy group,
an optionally substituted alkenyl group,
an optionally substituted alkenyloxy group,
an optionally substituted aryl group,
an optionally substituted aryloxy group,
an optionally substituted 5- or 6-membered aromatic heterocyclic group,
a —NR$^8$R$^9$ group wherein R$^8$ and R$^9$ are each independently a hydrogen atom, an optionally substituted alkyl group, or an optionally substituted alkenyl group, or together with a nitrogen atom adjacent to these, form a 5- to 7-membered saturated heterocycle, unless R$^8$ and R$^9$ are hydrogen atoms at the same time, or
a —CR$^{10}$R$^{11}$R$^{12}$ group wherein R$^{10}$, R$^{11}$, and R$^{12}$ are each independently
an optionally substituted alkyl group, an optionally substituted alkenyl group, or an optionally substituted aryl group.

According to the present disclosure, it is possible to provide a novel antimicrobial agent for a non-human animal by using a compound represented by formula (I) or (II) or a salt thereof. The compound represented by formula (I) or (II) or a salt thereof can be advantageously used for immediately exerting excellent antimicrobial activity against a fungus such as a microbe belonging to the genus *Malassezia*. Further, the compound represented by formula (I) or (II) or a salt thereof can be advantageously used for immediately exerting excellent antimicrobial activity against a bacterium such as a microbe belonging to the genus *Staphylococcus* as well.

DETAILED DESCRIPTION OF THE INVENTION

As used herein, "halogen" means fluorine, chlorine, bromine, or iodine, and is preferably fluorine, chlorine, or bromine.

Further, as used herein, the term "alkyl," "alkenyl," or "alkynyl" as a group or a part of a group means alkyl, alkenyl, or alkynyl, respectively, where the group is linear, branched chain, cyclic, or a combination thereof, unless otherwise defined. Further, for example, in the case of "alkyl having 1 to 6 carbon atoms" as a group or a part of a group, "1 to 6 carbon atoms" means that the alkyl group has 1 to 6 carbon atoms.

Further, as used herein, an alkyl group being "optionally substituted" means that one or more hydrogen atoms on the alkyl group may be replaced with one or more substituents (which may be the same or different). It will be apparent to those skilled in the art that the maximum number of substituents can be determined depending on the number of replaceable hydrogen atoms on the alkyl. The same also applies to a functional group other than an alkyl group.

When the alkyl group represented by any of R$^1$ to R$^{12}$ is linear or branched, the number of carbon atoms of the linear or branched alkyl group is preferably 1 to 12, more preferably 1 to 6, and even more preferably 1 to 3. Examples of the linear or branched alkyl group include a methyl group, an ethyl group, a n-propyl group, an isopropyl group, a n-butyl group, a sec-butyl group, an isobutyl group, a tert-butyl group, a n-pentyl group, a n-hexyl group, a heptyl group, an octyl group, a nonyl group, or a decyl group, and a methyl group, an ethyl group, a n-propyl group or an isopropyl group is preferable, and a methyl group or an ethyl group is more preferable.

When the alkyl group represented by any of R$^1$ to R$^{12}$ is cyclic, the number of carbon atoms of the cyclic alkyl group (cycloalkyl group) is preferably 3 to 7, and more preferably 3 to 6. Examples of the cycloalkyl group include a cyclopropyl group, a cyclobutyl group, a cyclopentyl group, or a cyclohexyl group.

The alkyl group is optionally substituted, and examples of the substituent include a halogen atom; an alkyloxy group optionally substituted with a halogen atom; an alkylthio group optionally substituted with a halogen atom; a phenyl group optionally substituted with a halogen atom; a phenyl group substituted with an alkyl group optionally substituted with a halogen atom; and a hydroxyl group. When the alkyl group is cyclic (cycloalkyl group), examples of the substituent include an alkyl group optionally substituted with a halogen atom in addition to the above substituents. The number of such substituents is preferably 0 to 5, and more preferably 1 or 2.

When the alkyloxy group represented by any of R$^1$, R$^2$, and R$^7$ is linear or branched, the number of carbon atoms of the alkyloxy group is preferably 1 to 12, more preferably 1 to 6, and even more preferably 1 to 3. Examples of the linear or branched alkyloxy group include a methoxy group, an ethoxy group, a n-propyloxy group, an isopropyloxy group, a n-butyloxy group, a sec-butyloxy group, an isobutyloxy group, a tert-butyloxy group, a n-pentyloxy group, a n-hexyloxy group, a heptyloxy group, an octyloxy group, a nonyloxy group, or a decyloxy group, and a methoxy group, an ethoxy group, a n-propyloxy group, or an isopropyloxy group are preferable, and a methoxy group or an ethoxy group is more preferable.

When the alkyloxy group represented by any of $R^1$, $R^2$, and $R^7$ is cyclic, the number of carbon atoms of the cyclic alkyloxy group (cycloalkyloxy group) is preferably 3 to 7, and more preferably 3 to 6. Examples of the cycloalkyloxy group include a cyclopropyloxy group, a cyclobutyloxy group, a cyclopentyloxy group, or a cyclohexyloxy group.

The alkyloxy group is optionally substituted, and examples of the substituent include a halogen atom; an alkyloxy group optionally substituted with a halogen atom; an alkylthio group optionally substituted with a halogen atom; a phenyl group optionally substituted with a halogen atom; a phenyl group substituted with an alkyl group optionally substituted with a halogen atom; and a hydroxyl group. When the alkyloxy group is cyclic (cycloalkyloxy group), examples of the substituent include an alkyl group optionally substituted with a halogen atom in addition to the above substituents. The number of such substituents is preferably 0 to 5, and more preferably 1 or 2.

When the alkenyl group represented by any of $R^1$, $R^2$, $R^3$, $R^7$, $R^{10}$, $R^{11}$, and $R^{12}$ is linear or branched, the number of carbon atoms of the linear or branched alkenyl group is preferably 2 to 12, more preferably 2 to 6, and even more preferably 2 to 4. Examples of the linear or branched alkenyl group include an allyl group and a geranyl group.

When the alkenyl group represented by any of $R^1$, $R^2$, $R^3$, $R^7$, $R^{10}$, $R^{11}$, and $R^{12}$ is cyclic, the number of carbon atoms of the cyclic alkenyl group (cycloalkenyl group) is preferably 5 to 8, and more preferably 5 or 6. Examples of the cycloalkenyl group include a cyclopentenyl group, a cyclohexenyl group, and a cyclooctenyl group.

The alkenyl group is optionally substituted, and examples of the substituent include a halogen atom; an alkyloxy group optionally substituted with a halogen atom; an alkylthio group optionally substituted with a halogen atom; a phenyl group substituted with a halogen atom; a phenyl group substituted with an alkyl group optionally substituted with a halogen atom; and a hydroxyl group. When the alkenyl group is cyclic (cycloalkenyl group), examples of the substituent include an alkyl group optionally substituted with a halogen atom in addition to the above substituents. The number of such substituents is preferably 0 to 5, and more preferably 1 or 2.

When the alkenyloxy group represented by any of $R^1$, $R^2$, and $R^7$ is linear or branched, the number of carbon atoms of the linear or branched alkenyloxy group is preferably 2 to 12, more preferably 2 to 6, and even more preferably 2 to 4. Examples of the linear or branched alkenyloxy group include a 2-propenyloxy group.

When the alkenyloxy group represented by any of $R^1$, $R^2$, and $R^7$ is cyclic, the number of carbon atoms of the cyclic alkenyloxy group (cycloalkenyloxy group) is preferably 5 to 8, and more preferably 5 or 6. Examples of the cycloalkenyloxy group include a cyclopentenyloxy group, a cyclohexenyloxy group, and a cyclooctenyloxy group.

The alkenyloxy group is optionally substituted, and examples of the substituent include a halogen atom; an alkyloxy group optionally substituted with a halogen atom; an alkylthio group optionally substituted with a halogen atom; a phenyl group optionally substituted with a halogen atom; a phenyl group substituted with an alkyl group optionally substituted with a halogen atom; and a hydroxyl group. When the alkenyloxy group is cyclic (cycloalkenyloxy group), examples of the substituent include an alkyl group optionally substituted with a halogen atom in addition to the above substituents. The number of such substituents is preferably 0 to 5, and more preferably 1 or 2. The number of such substituents is preferably 0 to 5, and more preferably 1 or 2.

When the alkynyl group represented by any of $R^1$, $R^2$, and $R^3$ is linear or branched, the number of carbon atoms of the linear or branched alkynyl group is preferably 2 to 12, more preferably 2 to 6, and even more preferably 2 to 4. Examples of the linear or branched alkynyl group include a 2-propynyl group.

When the alkynyl group represented by any of $R^1$, $R^2$, and $R^3$ is cyclic, the number of carbon atoms of the cyclic alkynyl group (cycloalkynyl group) is preferably 6 to 10. Examples of the cycloalkynyl group include a cyclooctynyl group.

The alkynyl group is optionally substituted, and examples of the substituent include a halogen atom; an alkyloxy group optionally substituted with a halogen atom; an alkylthio group optionally substituted with a halogen atom; a phenyl group optionally substituted with a halogen atom; a phenyl group substituted with an alkyl group optionally substituted with a halogen atom; and a hydroxyl group. When the alkynyl group is cyclic (cycloalkynyl group), examples of the substituent include an alkyl group optionally substituted with a halogen atom in addition to the above substituents. The number of such substituents is preferably 0 to 5, and more preferably 1 or 2.

When the alkynyloxy group represented by any of $R^1$ and $R^2$ is linear or branched, the number of carbon atoms of the linear or branched alkynyloxy group is preferably 2 to 12, more preferably 2 to 6, and even more preferably 2 to 4. Examples of the linear or branched alkynyloxy group include a 2-propynyloxy group.

When the alkynyloxy group represented by any of $R^1$ and $R^2$ is cyclic, the number of carbon atoms of the cyclic alkynyloxy group (cycloalkynyloxy group) is preferably 6 to 10. Examples of the cycloalkynyloxy group include a cyclooctynyloxy group.

The alkynyloxy group is optionally substituted, and examples of the substituent include a halogen atom; an alkyloxy group optionally substituted with a halogen atom; an alkylthio group optionally substituted with a halogen atom; a phenyl group optionally substituted with a halogen atom; a phenyl group substituted with an alkyl group optionally substituted with a halogen atom; and a hydroxyl group. When the alkynyloxy group is cyclic (cycloalkynyloxy group), examples of the substituent include an alkyl group optionally substituted with a halogen atom in addition to the above substituents. The number of such substituents is preferably 0 to 5, and more preferably 1 or 2.

The number of carbon atoms of the aryl group represented by any of $R^1$, $R^2$, $R^3$, $R^6$, $R^7$, $R^{10}$, $R^{11}$, and $R^{12}$ is preferably 6 to 14, and more preferably 6 to 10. Examples of the aryl group include a phenyl group and a naphthyl group, and a phenyl group is preferable.

The number of carbon atoms of the aryl moiety of the aryloxy group represented by any of $R^1$, $R^2$, $R^3$, $R^6$, $R^7$, $R^{10}$, $R^{11}$, and $R^{12}$ is preferably 6 to 14, and more preferably 6 to 10. Examples of the aryloxy group include a phenyloxy group and a naphthyloxy group, and a phenyloxy group is preferable.

The aryl group or the aryloxy group is optionally substituted, and examples of the substituent include a halogen atom; an alkyl group optionally substituted with a halogen atom; an alkyloxy group optionally substituted with a halogen atom; an alkylthio group optionally substituted with a halogen atom; a phenyl group optionally substituted with a halogen atom; a phenyl group substituted with an alkyl group optionally substituted with a halogen atom; and a hydroxyl group. The number of such substituents is preferably 0 to 5, and more preferably 1 or 2.

The 5- or 6-membered aromatic heterocyclic group represented by any of $R^1$, $R^2$, $R^3$, and $R^7$ is preferably an aromatic heterocycle having one or more heteroatoms selected from the group consisting of nitrogen, oxygen, and sulfur which are the same or different. The number of heteroatoms in the 5- or 6-membered aromatic heterocyclic group is preferably 1 to 4, more preferably 1 to 3, and even more preferably 1 or 2. Examples of the 5- or 6-membered aromatic heterocyclic group include a thienyl group, a furyl group, a thiazolyl group, and a pyridyl group.

The 5- or 6-membered aromatic heterocyclic group is optionally substituted, and examples of the substituent include a halogen atom, a nitro group, a cyano group, an alkyl group optionally substituted with a halogen atom, an alkyloxyalkyl group, an alkyloxy group optionally substituted with a halogen atom, a methylenedioxy group optionally substituted with a halogen atom, a $-NR^{13}R^{14}$ group wherein $R^{13}$ and $R^{14}$ are each a hydrogen atom, an alkyl group optionally substituted with a halogen atom, or an alkanoyl group, and a $-SO_pR^{15}$ group wherein $R^{15}$ is an alkyl group optionally substituted with a halogen atom, and p is an integer of 0 to 2. The number of such substituents is preferably 0 to 5, and more preferably 1 or 2. The alkyl moiety included in any of $R^{13}$ to $R^{15}$ may be the same as the alkyl moiety in any of $R^1$ to $R^{12}$ described above.

The 5- to 7-membered saturated heterocycle formed by $R^8$ and $R^9$ groups together with a nitrogen atom adjacent to these is preferably a saturated heterocycle having one or more heteroatoms selected from the group consisting of nitrogen, oxygen, and sulfur which are the same or different. The number of heteroatoms in the 5- to 7-membered saturated heterocycle is preferably 1 to 4, more preferably 1 to 3, and even more preferably 1 or 2. Examples of the 5- to 7-membered saturated heterocycle include a piperidine group, a pyrrolidine group, a morpholine group, a thiomorpholine group.

According to a preferable embodiment of the present disclosure, $R^1$ and $R^2$ are each independently a hydrogen atom, a halogen atom, a hydroxyl group, a nitro group, a cyano group, a thiocyanate group, a trimethylsilyl group, an optionally substituted linear or branched alkyl group, an optionally substituted cycloalkyl group, an optionally substituted linear or branched alkenyl group, an optionally substituted cycloalkenyl group, an optionally substituted linear or branched alkynyl group, an optionally substituted linear or branched alkyloxy group, an optionally substituted phenyloxy group, an optionally substituted phenyl group, an optionally substituted naphthyl group, an optionally substituted 5- or 6-membered aromatic heterocyclic group, $-SO_mR^3$ wherein $R^3$ is an optionally substituted linear or branched alkyl group, an optionally substituted cycloalkyl group, an optionally substituted linear or branched alkenyl group, an optionally substituted cycloalkenyl group, an optionally substituted linear or branched alkynyl group, an optionally substituted aryl group, an optionally substituted pyridyl group, a $-NR^4R^5$ group wherein $R^4$ and $R^5$ are each a linear or branched alkyl group, and m is an integer of 0 to 2, or a

[Formula 4]

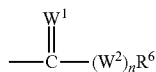

group wherein $W^1$ is an oxygen atom or a sulfur atom, $W^2$ is an oxygen atom, a sulfur atom, or $-NH-$, n is an integer of 0 or 1, and $R^6$ is an optionally substituted linear or branched alkyl group or an optionally substituted phenyl group.

Further, according to another preferable embodiment of the present disclosure, $R^1$ and $R^2$ are each independently a hydrogen atom, a halogen atom, a nitro group, a cyano group, an alkyl group optionally substituted with a halogen atom, an alkyl group substituted with an alkyloxy group optionally substituted with a halogen atom,
an alkyl group substituted with a phenyl group,
an alkyl group substituted with a phenyl group substituted with an
alkyl group, a halogen atom, or a hydroxyl group,
an alkenyl group optionally substituted with a halogen atom,
an alkyloxy group optionally substituted with a halogen atom,
a phenyl group optionally substituted with a halogen atom,
a phenyl group substituted with an alkyl group optionally substituted with a halogen atom,
a phenyl group substituted with an alkyloxy group optionally substituted with a halogen atom,
a thienyl group optionally substituted with a halogen atom,
a pyridyl group,
a furyl group,
a $-S(O)_mR^3$ group wherein $R^3$ is an alkyl group optionally substituted with a phenyl group, a phenyl group optionally substituted with a halogen atom, a pyridyl group optionally substituted an alkyl group substituted with a halogen atom, an alkenyl group, or a $-NR^4R^5$ group wherein $R^4$ and $R^5$ are each an alkyl group, and m is an integer of 0 to 2, or $-C(=O)-(NH)_nR^6$ wherein $R^6$ is an alkyl group optionally substituted with a halogen atom or a phenyl group optionally substituted with a halogen atom, and n is an integer of 0 or 1.

Further, according to another preferable embodiment of the present disclosure, $R^1$ is an unsubstituted alkyl group, an alkyl group substituted with a halogen atom, an alkyl group substituted with a phenyl group optionally substituted with a halogen atom, an alkenyl group optionally substituted with a halogen atom, an alkylthio group, an unsubstituted phenyl group, a phenyl group substituted with a halogen atom, a phenyl group substituted with an alkyl group optionally substituted with a halogen atom, or a phenyl group substituted with an alkyloxy group optionally substituted with a halogen atom, and $R^2$ is a halogen atom.

Further, according to another preferable embodiment of the present disclosure, $R^1$ is a methyl group, an ethyl group, a n-propyl group, an isopropyl group, a n-butyl group, an isobutyl group, a n-pentyl group, a 3-chloro-n-propyl group, a 4-chloro-n-butyl group, an allyl group, an ethylthio group, a phenyl group, a 2-chlorophenyl group, a 2-fluorophenyl group, a 2-methylphenyl group, a 3-methylphenyl group, a 4-methylphenyl group, a 2-chloro-4-methylphenyl group, a 3-chloro-4-methylphenyl group, a 4-chloro-3-methylphenyl group, a benzyl group, or a 2-fluorobenzyl group, and $R^2$ is a chlorine atom or a bromine atom.

Further, according to a more preferable embodiment of the present disclosure, $R^1$ and $R^2$ are each independently a hydrogen atom, a halogen atom, or an optionally substituted phenyl group.

Further, according to a more preferable embodiment of the present disclosure, $R^1$ and $R^2$ are each independently a hydrogen atom or a halogen atom, or a phenyl group optionally substituted with at least one group of an alkyl group and a halogen atom.

Further, according to a more preferable embodiment of the present disclosure, $R^1$ and $R^2$ are each independently a hydrogen atom or a halogen atom, or a phenyl group optionally substituted with at least one group of an alkyl group having 1 to 6 carbon atoms and a halogen atom.

Further, according to an even more preferable embodiment of the present disclosure, $R^1$ and $R^2$ are different groups from each other.

Further, according to a more preferable embodiment of the present disclosure, X is a hydrogen atom, a hydroxyl group, or —OY, preferably a hydrogen atom or a hydroxyl group, and more preferably a hydrogen atom.

According to a more preferable embodiment of the present disclosure, Y is a group represented by the formula:

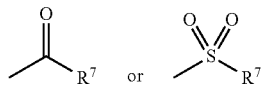

[Formula 5]

wherein $R^7$ is an optionally substituted linear or branched alkyl group, an optionally substituted cycloalkyl group, an optionally substituted phenyl group, an optionally substituted thienyl group, an optionally substituted furyl group, or a —$NR^8R^9$ group wherein $R^8$ and $R^9$ are each independently a hydrogen atom, an optionally substituted alkyl group, or an optionally substituted alkenyl group, or together with a nitrogen atom adjacent to these, form a 5- to 7-membered saturated heterocycle, unless $R^8$ and $R^9$ are hydrogen atoms at the same time.

Further, according to another preferable embodiment of the present disclosure, $R^7$ is an optionally substituted linear or branched alkyl group, an optionally substituted linear or branched alkyloxy group, an optionally substituted cycloalkyl group, an optionally substituted phenyl group, an optionally substituted phenyloxy group, a —$NR^8R^9$ group wherein $R^8$ and $R^9$ are each independently a hydrogen atom, an optionally substituted alkyl group, or an optionally substituted alkenyl group, or together with a nitrogen atom adjacent to these, form a 5- to 7-membered saturated heterocycle, unless $R^8$ and $R^9$ are hydrogen atoms at the same time, or a —$CR^{10}R^{11}R^{12}$ group wherein $R^{10}$, $R^{11}$, and $R^{12}$ are each independently an optionally substituted alkyl group or an optionally substituted phenyl group.

Further, according to another preferable embodiment of the present disclosure, $R^7$ is an optionally substituted alkyl group, an optionally substituted phenyl group, an optionally substituted alkyloxy group, or an optionally substituted phenyloxy group, or a —$CR^{10}R^{11}R^{12}$ group wherein $R^{10}$, $R^{11}$, and $R^{12}$ are each independently an optionally substituted alkyl group or an optionally substituted phenyl group.

Further, according to a particularly preferable embodiment of the present disclosure, the compound represented by formula (I) or (II) is selected from
5-chloro-4-(4-methylphenyl)-1H-imidazole-2-carbonitrile,
4-(4-methylphenyl)-1H-imidazole-2-carbonitrile,
5-chloro-4-(3-methylphenyl)-1H-imidazole-2-carbonitrile,
5-chloro-4-(2-methylphenyl)-1H-imidazole-2-carbonitrile, 5-chloro-4-(2-chloro-4-methylphenyl)-1H-imidazole-2-carbonitrile,
5-chloro-4-(3-chloro-4-methylphenyl)-1H-imidazole-2-carbonitrile,
5-chloro-4-(4-chloro-3-methylphenyl)-1H-imidazole-2-carbonitrile,
4-(2-chloro-4-methylphenyl)-1H-imidazole-2-carbonitrile,
5-chloro-1-hydroxy-4-(4-methylphenyl)-imidazole-2-carbonitrile, and
4-chloro-1-hydroxy-5-(4-methylphenyl)-imidazole-2-carbonitrile.

The compound represented by formula (I) or (II) or a salt thereof can be produced by the methods described in Japanese Patent Laid-Open No. H8-283243, Japanese Patent Laid-Open No. H8-225539, and the like.

The compounds of the present disclosure may be used singly or in combinations of two or more.

According to a preferable embodiment, the compound of the present disclosure may be in the form of a salt. The salt is preferably a pharmaceutically or cosmetically acceptable salt. The pharmaceutically or cosmetically acceptable salt refers to a salt that can be used as a medicament. When the compound represented by formula (I) or (II) has an acidic group or a basic group, the compound can be formed into a basic salt or an acidic salt by reacting the compound with a base or an acid.

Examples of the acidic salt include an inorganic acid salt such as a hydrochloride, a hydrobromide, a sulfate, a nitrate, or a phosphate, and an organic acid salt such as an acetate, a propionate, a tartrate, a fumarate, a maleate, a malate, a citrate, a methanesulfonate, a benzenesulfonate, or a para-toluenesulfonate. Further, examples of the basic salt include an alkali metal salt such as a sodium salt or a potassium salt, and an alkaline earth metal salt such as a calcium salt or a magnesium salt.

The compound of the present disclosure or a salt thereof may absorb water to have adsorbed water attached or become a hydrate when left in the air or recrystallized, and the compound of the present disclosure or a salt thereof also encompasses such various hydrates, solvates, and crystal polymorphic compounds.

The compound of the present disclosure or a salt thereof may be used as an agent as it is, and if necessary, can be formulated by a conventional method by combining the same with a further additional component such as the above carrier, active component, pharmacological component, or cosmetic component.

According to a preferable embodiment of the present disclosure, in the above formulation, the content of the compound of the present disclosure is usually 0.00001 to 30% by mass, preferably 0.0001 to 10% by mass, and more preferably 0.001 to 0.05% by mass.

According to a preferable embodiment of the present disclosure, the carrier used in the above formulation is preferably a pharmaceutically or cosmetically acceptable carrier, and examples thereof include a carrier that can be usually used such as an excipient, a coating agent, a binding agent, a bulking agent, a disintegrating agent, a lubricant, a diluent, an osmotic pressure adjusting agent, a pH adjusting agent, a dispersing agent, an emulsifying agent, an antiseptic, a stabilizing agent, an antioxidant, a coloring agent, a UV absorber, a moisturizing agent, a thickening agent, an activity enhancer, a fragrance, a corrigent, and a flavoring agent.

Further, examples the further additional component that may be used include a moisturizing agent, an anti-inflammatory agent, a microbicidal agent, an antimicrobial agent, a UV protective agent, a cell activating agent, and a makeup component.

The formulation containing a compound of the present disclosure or a salt thereof can be provided as a pharmaceutical product, a quasi drug, a veterinary drug, or a cosmetic.

According to a preferable embodiment, the form of the formulation containing a compound of the present disclosure or a salt thereof can be any form that can be used for a cosmetic such as a cream, a milky lotion, a lotion, a suspension, a gel, a powder, a pack, a sheet, a patch, a stick, or a cake, and is not particularly limited thereto.

Further, examples of a more specific form of the above formulation include, but are not particularly limited to, from the viewpoint of treatment of dermatitis or the like, an external medicament such as a lotion, a shampoo, a cream, a milky lotion, an ointment, or a patch, as well as a head or body cleanser such as a shampoo or a body shampoo, and a head or body cosmetic such as a rinse, a conditioner, a treatment, a hair pack, a hair tonic, a hair cream, and a head or body lotion, cream, or milky lotion.

The formulation of the present disclosure may be orally or parenterally administered. Examples of a dosage form for oral administration include a solid dosage form such as a tablet, a coated tablet, a granule, a powder, a capsule, and a liquid dosage form such as an elixir, a syrup, and a suspension. Examples of a dosage form for parenteral administration include an injection, an infusion, a topical, an external agent, a transdermal, a transmucosal, a transnasal, an enteral, an inhalation, a suppository, a bolus, and a patch. A preferable form of the formulation is a skin external agent such as an external powder, a liniment, a lotion, an ointment, a cream, a gel, an aerosol spray, a pump spray, a tape, or a cataplasm.

The compound of the present disclosure or a salt thereof can immediately exert excellent antimicrobial activity against a fungus such as a microbe belonging to the genus *Malassezia*. Therefore, according to one embodiment, the formulation of the present disclosure is used for ameliorating a symptom or a disease caused by a microbe belonging to the genus *Malassezia*. Here, the "ameliorating" includes not only the treatment of an established pathological condition but also prophylaxis that is the prevention or the delay of a pathological condition that can be established in the future. Further, the ameliorating in the present disclosure preferably also includes improvement of a symptom or a condition of a skin disease, the prevention or the delay of worsening of a symptom or a condition of a skin disease, and the reversal, the prevention, or the delay of the progression of a symptom or a condition of a skin disease.

In the present disclosure, the microbe belonging to the genus *Malassezia* is a fungus belonging to the family Malasseziaceae, and examples thereof include *Malassezia furfur*, *Malassezia pachydermatis*, *Malassezia globosa*, *Malassezia obtusa*, *Malassezia restricta*, *Malassezia sympodialis*, *Malassezia slooffiae*, *Malassezia dermatis*, *Malassezia yamatoensis*, *Malassezia japonica*, and *Malassezia nana*.

In the present disclosure, the microbe belonging to the genus *Microsporum* is a fungus belonging to the family Arthrodermataceae, and examples thereof include *Microsporum canis*.

In the present disclosure, the microbe belonging to the genus *Arthroderma* is a fungus belonging to the family Arthrodermataceae, and examples thereof include *Arthroderma vanbreuseghemii*.

According to a preferable embodiment, the symptom or the disease caused by a microbe belonging to the genus *Malassezia* is a skin disease. Examples of the skin disease derived from a microbe belonging to the genus *Malassezia* include tinea versicolor, folliculitis, seborrheic dermatitis, psoriasis vulgaris, and allergic dermatitis, and preferable examples include tinea versicolor, folliculitis, seborrheic dermatitis, psoriasis vulgaris, allergic dermatitis, canine *Malassezia* dermatitis, atopic dermatitis, *Malassezia* otitis externa, feline *Malassezia* dermatitis, *Malassezia* otitis externa, and equine *Malassezia* dermatitis.

The compound of the present disclosure or a salt thereof can also immediately exert excellent antimicrobial activity against a bacterium such as a microbe belonging to the genus *Staphylococcus*. Therefore, according to one embodiment, the formulation of the present disclosure is used for ameliorating a symptom or a disease caused by a microbe belonging to the genus *Staphylococcus*. Also here, the "ameliorating" includes not only the treatment of an established pathological condition but also prophylaxis that is the prevention or delay of a pathological condition that can be established in the future. Further, the ameliorating in the present disclosure preferably also includes improvement of a symptom or a condition of a skin disease, the prevention or the delay of worsening of a symptom or a condition of a skin disease, and the reversal, the prevention, or the delay of the progression of a symptom or a condition of a skin disease.

In the present disclosure, examples of the bacterium include a microbe belonging to the genus *Staphylococcus*, a microbe belonging to the genus *Streptococcus*, a microbe belonging to the genus *Pasteurella*, a microbe belonging to the genus *Escherichia*, a microbe belonging to the genus *Pseudomonas*, a microbe belonging to the genus *Proteus*, and a microbe belonging to the genus *Klebsiella*.

In the present disclosure, the microbe belonging to the genus *Staphylococcus* is a bacterium belonging to the family Staphylococcaceae, and examples thereof include *Staphylococcus pseudintermedius*, *Staphylococcus intermedius*, *Staphylococcus schleiferi*, *Staphylococcus delfini*, *Staphylococcus epidermidis*, *Staphylococcus xylosus*, and *Staphylococcus aureus*.

In the present disclosure, the microbe belonging to the genus *Streptococcus* is a bacterium belonging to the family Streptococcaceae, and examples thereof include *Streptococcus canis*, *Streptococcus pyrogenes*, *Streptococcus suis*, and *Streptococcus disgalactiae*.

In the present disclosure, the microbe belonging to the genus *Pasteurella* is a bacterium belonging to the family Pasteurellaceae, and examples thereof include *Pasteurella multocida*.

In the present disclosure, the microbe belonging to the genus *Escherichia* is a bacterium belonging to the family Enterobacteriaceae, and examples thereof include *Escherichia coli*.

In the present disclosure, the microbe belonging to the genus Pseudomonadaceae is a bacterium belonging to the family *Pseudomonas*, and examples thereof include *Pseudomonas aeruginosa*.

In the present disclosure, the microbe belonging to the genus *Proteus* is a bacterium belonging to the family Enterobacteriaceae, and examples thereof include *Proteus mirabilis*.

In the present disclosure, the microbe belonging to the genus *Klebsiella* is a bacterium belonging to the family Enterobacteriaceae, and examples thereof include *Klebsiella pneumoniae*.

According to a preferable embodiment, the symptom or the disease caused by a bacterium is a skin disease. Examples of the skin disease derived from a bacterium include pyoderma and otitis externa.

The administration target of the compound of the present disclosure or a salt thereof is preferably a non-human animal in consideration of, for example, the necessity of sterilization of a fungus such as a microbe belonging to the genus *Malassezia* or a bacterium such as a microbe belonging to the genus *Staphylococcus*. Examples of a more specific administration target include an animal in need of suppression of the proliferation of a fungus such as a microbe belonging to the genus *Malassezia* or a bacterium such as a microbe belonging to the genus *Staphylococcus*, or improvement of a skin disease derived from a fungus such as a microbe belonging to the genus *Malassezia* or a bacterium such as a microbe belonging to the genus *Staphylococcus*. More specifically, it is preferable to administer the compound of the present disclosure or a salt thereof to a non-human animal such as a dog, a cat, or a horse. The administration site of the compound of the present disclosure or a salt thereof is not particularly limited, and may be a tissue, an organ, or a cell of skin or the like in which the target fungus is present.

The compound of the present disclosure or a salt thereof can be administered in an effective amount for producing antifungal activity to a subject in need thereof to suppress the proliferation of, or sterilize, a fungus. Therefore, according to another embodiment of the present disclosure, a method for suppressing the proliferation of, or sterilizing, a fungus in a subject, including administering an effective amount of a compound represented by formula (I) or (II) to the subject in need thereof is provided. According to another preferable embodiment, the fungus is a microbe belonging to the genus *Malassezia*. According to another preferable embodiment, the fungus is *Malassezia pachydermatis*. Further, according to another preferable embodiment of the present disclosure, a method for improving a symptom or a disease caused by a microbe belonging to the genus *Malassezia*, including administering an effective amount of a compound represented by formula (I) or (II) to a subject in need thereof is provided. Further, according to another preferable embodiment of the present disclosure, a method for improving a symptom or a disease caused by *Malassezia pachydermatis*, including administering an effective amount of a compound represented by formula (I) or (II) to a non-human animal such as a dog, a cat, or a horse in need thereof is provided.

The compound of the present disclosure or a salt thereof can be administered to a subject in need thereof in an effective amount for producing antibacterial activity to suppress the proliferation of, or sterilize, a bacterium. Therefore, according to another embodiment of the present disclosure, a method for suppressing the proliferation of, or sterilizing, a bacterium in a subject, including administering an effective amount of a compound represented by formula (I) or (II) to the subject in need thereof is provided. According to another preferable embodiment, the bacterium is a microbe belonging to the genus *Staphylococcus*. According to another preferable embodiment, the bacterium is *Staphylococcus pseudointermedius*. Further, according to another preferable embodiment of the present disclosure, a method for improving a symptom or a disease caused by a microbe belonging to the genus *Staphylococcus*, including administering an effective amount of a compound represented by formula (I) or (II) to a subject in need thereof is provided. Further, according to another preferable embodiment of the present disclosure, a method for ameliorating a symptom or a disease caused by *Staphylococcus pseudointermedius*, including administering an effective amount of a compound represented by formula (I) or (II) to a non-human animal such as a dog, a cat, or a horse in need thereof is provided.

The method of the present disclosure may be a therapeutic method or a non-therapeutic method. Specifically, the method of the present disclosure may be used for a cosmetic purpose or non-therapeutically used for a health promotion purpose. Therefore, according to a preferable embodiment of the present disclosure, the method does not include a medical practice, that is, a therapeutic treatment practice to an individual.

The effective amount of the compound of the present disclosure or a salt thereof varies depending on the animal species, sex, age, body weight, condition, and other factors of the administration target, and is an amount that reduces the proliferation of the target microbe to 50% or less, preferably 40% or less, more preferably 30% or less, further preferably 20% or less, and further more preferably 10% or less of that of the control.

In the above administration, the dose, administration route, and administration interval of the compound of the present disclosure vary depending on the animal species, sex, age, body weight, condition, and other factors of the administration target and thus cannot be unconditionally specified. For example, for the dosage of the compound of the present disclosure when topically administered to an affected area of a dog, the daily dose is usually 0.005 to 350 mg/day, and the preferable weekly dose is 0.01 to 175 mg/week, per adult dog weighing 10 kg. Further, for the dosage of the compound of the present disclosure when topically administered to an affected area of a cat, the daily dose is usually 0.002 to 140 mg/day, and the preferable weekly dose is 0.004 to 70 mg/week, per adult cat weighing 4 kg.

Further, according to another embodiment of the present disclosure, use of a compound represented by formula (I) or (II) or a salt thereof in the production of an antifungal agent is provided. Further, according to another preferable embodiment of the present disclosure, use of a compound represented by formula (I) or (II) or a salt thereof in the production of a formulation for ameliorating a symptom or a disease caused by a microbe belonging to the genus *Malassezia* is provided. Further, according to another preferable embodiment of the present disclosure, the above symptom or disease is a skin disease. Further, according to another preferable embodiment of the present disclosure, the above symptom or disease is tinea versicolor, folliculitis, seborrheic dermatitis, psoriasis vulgaris, atopic dermatitis, or otitis externa. Further, according to another preferable embodiment of the present disclosure, the above use is cosmetic or non-therapeutic use.

Further, according to another embodiment of the present disclosure, use of a compound represented by formula (I) or (II) or a salt thereof in the production of an antibacterial agent is provided. Further, according to another preferable embodiment of the present disclosure, use of a compound represented by formula (I) or (II) or a salt thereof in the production of a formulation for improving a symptom or a disease caused by a microbe belonging to the genus *Staphylococcus* is provided. Further, according to another preferable embodiment of the present disclosure, the above symptom or disease is a skin disease. Further, according to another preferable embodiment of the present disclosure, the above symptom or disease is pyoderma or otitis externa. Further, according to another preferable embodiment of the present disclosure, the above use is cosmetic or non-therapeutic use.

Further, according to another embodiment of the present disclosure, a compound represented by formula (I) or (II) or a salt thereof for use as an antifungal agent is provided. Further, according to another preferable embodiment of the present disclosure, a compound represented by formula (I) or (II) or a salt thereof for ameliorating a symptom or a disease caused by a microbe belonging to the genus *Malassezia* is provided. Further, according to another preferable embodiment of the present disclosure, the above symptom or disease is a skin disease. Further, according to another preferable embodiment of the present disclosure, the above symptom or disease is tinea versicolor, folliculitis, seborrheic dermatitis, psoriasis vulgaris, atopic dermatitis, or otitis externa. Further, according to another preferable embodiment of the present disclosure, the above antifungal agent is a veterinary drug.

Further, according to another embodiment of the present disclosure, a compound represented by formula (I) or (II) or a salt thereof for use as an antibacterial agent is provided. Further, according to another preferable embodiment of the present disclosure, a compound represented by formula (I) or (II) or a salt thereof for ameliorating a symptom or a disease caused by a microbe belonging to the genus *Staphylococcus* is provided. Further, according to another preferable embodiment of the present disclosure, the above symptom or disease is a skin disease. Further, according to another preferable embodiment of the present disclosure, the above symptom or disease is pyoderma or otitis externa. Further, according to another preferable embodiment of the present disclosure, the above antibacterial agent is a veterinary drug.

In addition, according to one embodiment of the present disclosure, the following are provided.

[1] An antimicrobial agent for a non-human animal comprising a compound represented by formula (I) or (II) or a salt thereof

[Formula 6]

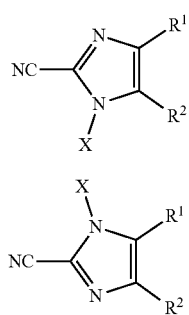

wherein
$R^1$ and $R^2$ are each independently
a hydrogen atom,
a halogen atom,
a hydroxyl group,
a nitro group,
a cyano group,
a thiocyanate group,
a trimethylsilyl group,
an optionally substituted alkyl group,
an optionally substituted alkenyl group,
an optionally substituted alkynyl group,
an optionally substituted alkyloxy group,
an optionally substituted alkenyloxy group,
an optionally substituted alkynyloxy group,
an optionally substituted aryl group,
an optionally substituted aryloxy group,
an optionally substituted 5- or 6-membered aromatic heterocyclic group,
—SO$_m$R$^3$
wherein $R^3$ is an optionally substituted alkyl group, an optionally substituted alkenyl group, an optionally substituted alkynyl group, an optionally substituted aryl group, an optionally substituted 5- or 6-membered aromatic heterocyclic group, or a —NR$^4$R$^5$ group wherein $R^4$ and $R^5$ are each an optionally substituted alkyl group, and m is an integer of 0 to 2, or a group represented by

[Formula 7]

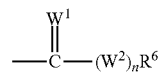

wherein
$W^1$ is an oxygen atom or a sulfur atom,
$W^2$ is an oxygen atom, a sulfur atom, or —NH—
n is an integer of 0 or 1,
$R^6$ is an optionally substituted alkyl group or an optionally substituted aryl group;
X is a hydrogen atom, a hydroxyl group, or —OY; and
Y is a formula:

[Formula 8]

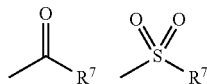

wherein
$R^7$ is an optionally substituted alkyl group,
an optionally substituted alkyloxy group,
an optionally substituted alkenyl group,
an optionally substituted alkenyloxy group,
an optionally substituted aryl group,
an optionally substituted aryloxy group,
an optionally substituted 5- or 6-membered aromatic heterocyclic group, a —NR$^8$R$^9$ group wherein $R^8$ and $R^9$ are each independently a hydrogen atom, an optionally substituted alkyl group, or an optionally substituted alkenyl group, or together with a nitrogen atom adjacent to these, form a 5- to 7-membered saturated heterocycle, unless $R^8$ and $R^9$ are hydrogen atoms at the same time, or
a —CR$^{10}$R$^{11}$R$^{12}$ group wherein $R^{10}$, $R^{11}$, and $R^{12}$ are each independently an optionally substituted alkyl group, an optionally substituted alkenyl group, or an optionally substituted aryl group.

[2] The antimicrobial agent according to [1], wherein $R^1$ and $R^2$ are each independently a hydrogen atom, a halogen atom, or an optionally substituted phenyl group.

[3] The antimicrobial agent according to [1] or [2], wherein $R^1$ and $R^2$ are each independently a hydrogen atom or a halogen atom, or a phenyl group optionally substituted with at least one group of an alkyl group and a halogen atom.

[4] The antimicrobial agent according to any one of [1] to [3], wherein $R^1$ and $R^2$ are each independently a hydrogen atom or a halogen atom, or a phenyl group optionally substituted with at least one group of an alkyl group having 1 to 6 carbon atoms and a halogen atom.

[2] The antimicrobial agent according to any one of [1] to [4], wherein $R^1$ and $R^2$ are different groups from each other.

[6] The antimicrobial agent according to any one of [1] to [5], wherein
X is a hydrogen atom, a hydroxyl group, or —OY; and
Y is a group represented by a formula:

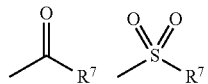

[Formula 9]

wherein $R^7$ is an optionally substituted alkyl group, an optionally substituted phenyl group, an optionally substituted alkyloxy group, an optionally substituted phenyloxy group, or a —$CR^{10}R^{11}R^{12}$ group wherein $R^{10}$, $R^{11}$, and $R^{12}$ are each independently an optionally substituted alkyl group or an optionally substituted phenyl group.

[7] The antimicrobial agent according to any one of [1] to [6], wherein X is a hydrogen atom or a hydroxyl group.

[8] The antimicrobial agent according to any one of [1] to [7], wherein
the compound represented by formula (I) or (II) is selected from
5-chloro-4-(4-methylphenyl)-1H-imidazole-2-carbonitrile,
4-(4-methylphenyl)-1H-imidazole-2-carbonitrile,
5-chloro-4-(3-methylphenyl)-1H-imidazole-2-carbonitrile,
5-chloro-4-(2-methylphenyl)-1H-imidazole-2-carbonitrile,
5-chloro-4-(2-chloro-4-methylphenyl)-1H-imidazole-2-carbonitrile,
5-chloro-4-(3-chloro-4-methylphenyl)-1H-imidazole-2-carbonitrile,
5-chloro-4-(4-chloro-3-methylphenyl)-1H-imidazole-2-carbonitrile,
4-(2-chloro-4-methylphenyl)-1H-imidazole-2-carbonitrile,
5-chloro-1-hydroxy-4-(4-methylphenyl)-imidazole-2-carbonitrile, and
4-chloro-1-hydroxy-5-(4-methylphenyl)-imidazole-2-carbonitrile.

[9] The antimicrobial agent according to any one of [1] to [8], wherein the microbe is a fungus.

[10] The antimicrobial agent according to [9], wherein the fungus is at least one selected from a microbe belonging to the genus *Malassezia*, a microbe belonging to the genus *Microsporum*, and a microbe belonging to the genus *Arthroderma*.

[11] The antimicrobial agent according to [9] or [10] for ameliorating a symptom or a disease caused by at least one selected from a microbe belonging to the genus *Malassezia*, a microbe belonging to the genus *Microsporum*, and a microbe belonging to the genus *Arthroderma*.

[12] The antimicrobial agent according to [11], wherein the symptom or disease is a skin disease.

[13] The antimicrobial agent according to [11] or [12], wherein the symptom or disease is tinea versicolor, folliculitis, seborrheic dermatitis, psoriasis vulgaris, atopic dermatitis, dermatophytosis, or otitis externa.

[14] The antimicrobial agent according to any one of [1] to [8], wherein the microbe is a bacterium.

[15] The antimicrobial agent according to [14], wherein the bacterium is at least one selected from a microbe belonging to the genus *Staphylococcus*, a microbe belonging to the genus *Streptococcus*, a microbe belonging to the genus *Pasteurella*, a microbe belonging to the genus *Escherichia*, a microbe belonging to the genus Pseudomonaceae, a microbe belonging to the genus *Proteus*, and a microbe belonging to the genus *Klebsiella*.

[16] The antimicrobial agent according to [14] or [15] for ameliorating a symptom or a disease caused by at least one selected from a microbe belonging to the genus *Staphylococcus*, a microbe belonging to the genus *Streptococcus*, a microbe belonging to the genus *Pasteurella*, a microbe belonging to the genus *Escherichia*, a microbe belonging to the genus *Pseudomonas*, a microbe belonging to the genus *Proteus*, and a microbe belonging to the genus *Klebsiella*.

[17] The antimicrobial agent according to [16], wherein the symptom or disease is a skin disease.

[18] The antimicrobial agent according to [16] or [17], wherein the symptom or disease is pyoderma or otitis externa.

[19] The antimicrobial agent according to any one of [1] to [18], wherein the non-human animal is a dog, a cat, or a horse.

EXAMPLES

Next, test examples according to the present disclosure will be described, but these do not limit the present disclosure.

Production Example 1:5-Chloro-4-(4-methylphenyl)-1H-imidazole-2-carbonitrile (Compound No. 1)

5-Chloro-4-(4-methylphenyl)-1H-imidazole-2-carbonitrile (Compound No. 1) was produced according to the method described in Examples 1 to 5 of Japanese Patent Laid-Open No. H8-225539 (CAS number: 120118-14-1).

Production Example 2:4-(4-Methylphenyl)-1H-imidazole-2-carbonitrile (Compound No. 2)

Compound No. 2 was produced according to the same method as described in Japanese Patent Laid-Open No. H8-225539 except that a raw material compound corresponding to the production target was used (CAS number: 120118-10-7).
MS: 184.2 [M+H]$^+$ Production Example 3:5-Chloro-4-(3-methylphenyl)-1H-imidazole-2-carbonitrile (Compound No. 3)

Compound No. 3 was produced according to the same method as described in Japanese Patent Laid-Open No. H8-225539 except that a raw material compound corresponding to the production target was used (CAS number: 120118-18-5).
MS: 218.2 [M+H]$^+$ Production Example 4:5-Chloro-4-(2-methylphenyl)-1H-imidazole-2-carbonitrile (Compound No. 4)

Compound No. 4 was produced according to the same method as described in Japanese Patent Laid-Open No.

H8-225539 except that a raw material compound corresponding to the production target was used.

1H-NMR (DMSO-d6): δ 7.45-7.31 (m, 4H), 3.45-3.28 (br, 1H), 2.23 (s, 3H)

MS: 218.1 [M+H]$^+$

Production Example 5:5-Chloro-4-(2-chloro-4-methylphenyl)-1H-imidazole-2-carbonitrile (Compound No. 5)

Compound No. 5 was produced according to the same method as described in Japanese Patent Laid-Open No. H8-225539 except that a raw material compound corresponding to the production target was used (CAS number: 2167064-69-7).

MS: 252.2 [M+H]$^+$

Production Example 6:5-Chloro-4-(3-chloro-4-methylphenyl)-1H-imidazole-2-carbonitrile (Compound No. 6)

Compound No. 6 was produced according to the same method as described in Japanese Patent Laid-Open No. H8-225539 except that a raw material compound corresponding to the production target was used (CAS number: 120118-82-3).

MS: 252.1 [M+H]$^+$

Production Example 7:5-Chloro-4-(4-chloro-3-methylphenyl)-1H-imidazole-2-carbonitrile (Compound No. 7)

Compound No. 7 was produced according to the same method as described in Japanese Patent Laid-Open No. H8-225539 except that a raw material compound corresponding to the production target was used.

1H-NMR (DMSO-d6): δ 7.73 (s, 1H), 7.62-7.58 (m, 2H), 3.80-3.00 (br, 1H), 2.40 (s, 3H)

MS: 251.0 [M+H]$^+$

Production Example 8:4-(2-chloro-4-methylphenyl)-1H-imidazole-2-carbonitrile (Compound No. 8)

Compound No. 8 was produced according to the same method as described in Japanese Patent Laid-Open No. H8-225539 except that a raw material compound corresponding to the production target was used.

1H-NMR (DMSO-d6): δ 8.10-7.93 (br, 1H), 7.93-7.77 (br, 1H), 7.38 (s, 1H), 7.24 (d, 1H, J=8.0 Hz), 3.32 (s, 1H), 2.34 (s, 3H) MS: 218.1 [M+H]$^+$

Production Example 9: 5-Chloro-1-hydroxy-4-(4-methylphenyl)-imidazole-2-carbonitrile (Compound No. 9)

Compound No. 9 was produced according to the same method as described in Japanese Patent Laid-Open No. H8-225539 except that a raw material compound corresponding to the production target was used.

1H-NMR (DMSO-d6): δ 7.72 (d, 2H, J=8.0 Hz), 7.26 (d, 2H, J=8.0 Hz), 3.45-3.15 (br, 1H), 2.31 (s, 3H)

MS: 234.1 [M+H]$^+$

Production Example 10:4-Chloro-1-hydroxy-5-(4-methylphenyl)-imidazole-2-carbonitrile (Compound No. 10)

Compound No. 10 was produced according to the same method as described in Japanese Patent Laid-Open No. H8-225539 except that a raw material compound corresponding to the production target was used (CAS number: 177762-70-8).

MS: 234.1 [M+H]+

Test Example 1

Antimicrobial Activity Test

Test microbial strain: *Malassezia pachydermatis* (IFM56528 strain, strain obtained from Chiba University)

The *Malassezia* microbe (*Malassezia pachydermatis*) cultured for 5 to 7 days in a Sabouraud medium (1% peptone, 4% dextrin, 1.5% agar) supplemented with 0.5% of Tween 40 (polyoxyethylene sorbitan monopalmitate: manufactured by Kanto Chemical Co., Inc.) was suspended in physiological saline and a suspension thereof was prepared in such a way as to have an absorbance of 0.25 at 550 nm. Thereto, the test compound dissolved in DMSO was added in such a way as to provide a final concentration of 500 ppm, and after 1 minute, 10 μL of the suspension and 10 ml of physiological saline were placed in a syringe and stirred, and the syringe was connected to a 37 mm Quality Monitor (manufactured by Pall Corporation) followed by filtration and washing. The membrane filter was impregnated as it was with a Sabouraud medium supplemented with 1% of Tween80 (polyoxyethylene sorbitan monooleate: manufactured by Kanto Chemical Co., Ltd.) and subjected to culturing at 32° C. for 72 hours, the number of colonies formed there (number of colonies in the inventive plot) and the number of colonies in a solvent to which the test compound was not added (the number of colonies in the non-agent treated plot) were measured, and the colony formation inhibition rate (%) was determined according to the following expression.

Colony formation inhibition rate (%)=[(number of colonies in non-agent treated plot-number of colonies in inventive plot)/number of colonies in non-agent treated plot]×100

As a result, compound Nos. 1 to 10 all inhibited colony formation by 100%. It was confirmed that compound Nos. 1 to 10 exerted antimicrobial activity immediately against the *Malassezia* microbe.

Test Example 2

Test of Antimicrobial Activity Against Various Microbes Belonging to Genus *Malassezia*

Test compound: Compound No. 1 (final concentration of 500 ppm)

Test microbial strains: *Malassezia pachydermatis* (IFM56528 strain), *M. furfur* (IMF55951 strain), *M. sympodialis* (IMF48588 strain), *M. globosa* (IMF51946 strain), and *M. restricta* (IMF55992 strain)

The colony formation inhibition rate for each of the test strains was determined by the same method as in Test Example 1. Test results are shown in Table 1.

TABLE 1

| Test microbe | Colony formation inhibition rate (%) |
|---|---|
| M. pachydermatis | 100 |
| M. furfur | 100 |
| M. sympodialis | 100 |
| M. globosa | 97 |
| M. restricta | 100 |

Test Example 3: *Malassezia* Otitis Externa Effect Test (Dog)

Test variety: Beagle (19 to 20-month-old)

Test microbial strain: *Malassezia pachydermatis* (ATCC14522 strain)

A colony of the *Malassezia* microbe pre-cultured (7 days, 30° C.) on a Sabouraud agar medium was suspended in sterilized physiological saline (microbial concentration of $1.0 \times 10^6$ cells/mL), and 0.1 mL of the resulting suspension was inoculated into both ears of the test animal. 7 Days after the inoculation, both ears were filled with 5 mL of an agent solution (sterilized physiological saline solution supplemented with 5% DMSO) prepared to have a concentration of the test compound of 500 ppm, and after 1 minute, thoroughly washed with sterilized physiological saline solution. 7 Days after the agent solution treatment, the condition of the ears of the sample was observed for four items of redness, earwax, itching, and rash, each thereof was scored as 1 when a symptom was observed and 0 when no symptom was observed, and the improvement rate of the symptom was determined. Results are shown in Table 2.

At the same time, the number of the *Malassezia* microbe present inside the ears of the sample was also investigated by the following method.

The surface of the ear canal was scraped three times using a cotton swab to collect the microbe, and the collected microbe was suspended in 1 mL of PBS (containing 8 g of sodium chloride, 2.9 g of disodium hydrogen phosphate, 0.2 g of potassium chloride, and 0.2 g of potassium dihydrogen phosphate in 1000 mL) supplemented with 1% v/v of Tween80 (polyoxyethylene sorbitan monooleate: manufactured by Kanto Chemical Co., Ltd.) together with the cotton swab. The resulting suspension was serially diluted 10-fold with the PBS, and 0.1 mL thereof was applied to a CHROMagar *Malassezia*/*Candida* medium (trade name; peptone, special enzyme substrate mixture, chloramphenicol, olive oil, agar) and cultured at 30° C. for 4 days. After that, the colonies having a pink to purple color were counted, the microbial count score was calculated, and the improvement rate was determined. Results are shown in Table 3.

TABLE 2

| | | Total score | | |
|---|---|---|---|---|
| Test compound | Site | Immediately before treatment | 7 Days after treatment | Improvement rate (%) |
| Compound No. 1 | Right ear | 3 | 1 | 67 |
| | Left ear | 3 | 1 | 67 |
| Compound No. 6 | Right ear | 3 | 0 | 100 |
| | Left ear | 3 | 0 | 100 |
| Compound No. 7 | Right ear | 3 | 0 | 100 |
| | Left ear | 3 | 0 | 100 |
| Compound No. 9 | Right ear | 3 | 1 | 67 |
| | Left ear | 3 | 1 | 67 |
| Non-treated | Right ear | 2 | 2 | 0 |
| | Left ear | 2 | 2 | 0 |

TABLE 3

| | | Microbial count (cfu/ml) | | |
|---|---|---|---|---|
| Test compound | Site | Immediately before treatment | 7 Days after treatment | Improvement rate (%) |
| Compound No. 1 | Right ear | 1,300 | 30 | 97.7 |
| | Left ear | 900 | 30 | 96.7 |
| Compound No. 6 | Right ear | 2,800 | 20 | 99.3 |
| | Left ear | 5,300 | 20 | 99.6 |
| Compound No. 7 | Right ear | 160 | 30 | 81.3 |
| | Left ear | 480 | 20 | 95.8 |
| Compound No. 9 | Right ear | 1,600 | 30 | 98.1 |
| | Left ear | 1,100 | 20 | 98.2 |
| Non-treated | Right ear | 1,600 | 1,100 | 31.3 |
| | Left ear | 100 | 800 | 0 |

Test Example 4: Antimicrobial Activity Test

Test compound: Compound No. 1

Test microbial strain: *Microsporum canis* (TIMM20080 strain)

The microbial strain was cultured in a Sabouraud medium containing 500 μg/mL of cycloheximide and 50 μg/ml of chloramphenicol at 28° C. for 8 days, then spores were collected in physiological saline containing Tween80 (0.05% (v/v)), this was filtered through a cell strainer (φ40 μm), the spores were recovered from the filtrate by centrifugation (3500 rpm, 5 minutes) and washed twice with physiological saline, and then a spore suspension was prepared (1×10$^7$ spores/mL). 10 μL of the spore suspension was inoculated into Sabouraud media to which compound No. 1 dissolved in DMSO was added to have various concentrations. After culturing at 28° C. for 72 hours, the amount of microbial growth was investigated, and the minimum inhibitory concentration was determined.

As a result, the minimum inhibitory concentration of compound No. 1 was 10 ppm.

Test Example 5: Antimicrobial Activity Test

Test compound: Compound No. 6
Test microbial strain: *Microsporum canis* (NBRC7863)
The strain was cultured in a Sabouraud medium and then suspended in PBS containing Tween80 (1% (V/V)), the resulting suspension was filtered through a cell strainer (φ40 μm), spores were recovered from the filtrate by centrifugation (3500 rpm, 5 minutes) and washed twice with physiological saline, and then a spore suspension was prepared (1×10$^6$ spores/mL). 50 μL of the spore suspension was inoculated into Sabouraud media to which compound No. 6 dissolved in DMSO was added to have various concentrations. After culturing at 25° C. for 120 hours, the presence or absence of microbial growth was investigated, and the minimum inhibitory concentration was determined.

As a result, the minimum inhibitory concentration of compound No. 6 was 125 ppm.

Test Example 6: Antimicrobial Activity Test

Test compound: Compound No. 6
Test microbial strain: *Staphylococcus pseudointermedius* (JCM 17571)
The *staphylococcus* (*Staphylococcus pseudointermedius*) cultured for 24 hours on a Luria Broth (LB) agar medium plate (peptone, yeast extract, sodium chloride, agar, Invitrogen) was suspended in physiological saline, and a suspension thereof was prepared in such a way as to have an absorbance of 0.025 at 600 nm. Thereto, the test compound dissolved in DMSO was added in such a way as to provide a final concentration of 200, 100, 50, or 25 ppm, and after 1 minute, 10 μL of the suspension and 10 ml of physiological saline were placed in a syringe and stirred, and the syringe was connected to a 37 mm Quality Monitor (manufactured by Pall Corporation) followed by filtration and washing twice with 10 mL of physiological saline. The membrane filter was impregnated as it was with an LB medium and subjected to culturing at 30° C. for 72 hours, the presence or absence of colony growth was investigated, and the minimum bactericidal concentration (MBC100) was determined. Results thereof are shown in Table 4.

Table 4

TABLE 4

| Microbial species | Minimum bactericidal concentration (MBC100) |
| --- | --- |
| *S. pseudintermedius* | 50 ppm |

Test Example 7: Antifungal Activity Test

Test compound: Compound No. 6
Test microbial strain: *Microsporum canis* (IFM63627)
The antifungal activity was studied by partially modifying the method of Test Example 5. *Microsporum canis* was cultured at 32° C. for 168 hours in a 1/10 Sabouraud medium to form spores, then 10 mL of physiological saline (Otsuka Normal Saline; containing 9 g of sodium chloride in 1000 mL) was added directly onto the medium, and the surface was rubbed using a disposable loop (type 1 (1 μL)) to recover a spore suspension containing hyphae. The spore suspension containing hyphae was filtered through a cell strainer (φ40 μm). The spores were recovered from the filtrate by centrifugation (3500 rpm, 5 minutes) and washed twice with physiological saline, and then a spore suspension was prepared (1×10$^7$ spores/mL). 10 μL of the spore suspension was inoculated into a Sabouraud medium to which the test compound dissolved in DMSO was added to have a predetermined concentration. *Microsporum canis* was cultured at 32° C. for 72 hours, then the presence or absence of colony growth was investigated, and the minimum inhibitory concentration (MIC100) was determined. Results thereof are shown in Table 5.

Table 5

TABLE 5

| Microbial species | Minimum inhibitory concentration (MIC100) |
| --- | --- |
| *Microsporum canis* | 5 ppm |

Test Example 8: Antifungal Activity Test

Test compound: Compound No. 6
Test microbial strain: *Microsporum canis* (IFM63627)
*Microsporum canis* was cultured at 32° C. for 168 hours in a 1/10 Sabouraud medium to form spores, then 10 mL of physiological saline (Otsuka Normal Saline; containing 9 g of sodium chloride in 1000 mL) was added directly onto the medium, and the surface was rubbed using a disposable loop (type 1 (1 μL)) to recover a spore suspension containing hyphae. The spore suspension containing hyphae was filtered through a cell strainer (φ40 μm). The spores were recovered from the filtrate by centrifugation (3500 rpm, 5 minutes) and washed twice with physiological saline, and then a spore suspension was prepared (1×10$^7$ spores/mL). 10 μL of the spore suspension was inoculated into 90 μL of physiological saline to which compound No. 6 dissolved in DMSO was added to have a predetermined concentration. Every time a predetermined time elapsed, 10 μL of a test liquid containing the spores was collected, the spores were recovered by centrifugation (3500 rpm, 5 minutes) and washed twice with physiological saline, and then a 10-μL spore suspension was prepared. The 10-μL spore suspension was spotted onto a Sabouraud medium and subjected to culturing at 32° C. for 72 hours, the presence or absence of colony growth was investigated, and the minimum fungicidal concentration (MFC100) was determined. Results thereof are shown in Table 6.

Table 6

TABLE 6

| Microbial species | Treatment time | Minimum fungicidal concentration (MFC100) |
|---|---|---|
| Microsporum canis | 24 Hours | 50 ppm |
| | 96 Hours | 10 ppm |

Test Example 9: Antifungal Activity Test

Test compound: Compound No. 1
Test microbial strain: Arthroderma vanbreuseghemii (TIMM2789)

The microbial strain was cultured in a Sabouraud medium containing 500 μg/mL of cycloheximide and 50 μg/ml of chloramphenicol at 28° C. for 8 days, then spores were collected in physiological saline containing Tween80 (0.05% (v/v)), this was filtered through a cell strainer (φ40 μm), the spores were recovered from the filtrate by centrifugation (3500 rpm, 5 minutes) and washed twice with physiological saline, and then a spore suspension was prepared ($1\times10^7$ spores/mL). 10 μL of the spore suspension was inoculated into Sabouraud media to which compound No. 1 dissolved in DMSO was added to have various concentrations. After culturing at 28° C. for 72 hours, the amount of microbial growth was investigated, and the minimum inhibitory concentration (MIC100) was determined. Results thereof are shown in Table 7.

Table 7

TABLE 7

| Microbial species | Minimum inhibitory concentration (MIC100) |
|---|---|
| Arthroderma vanbreuseghemii | 10 ppm |

Test Example 10-1: Antifungal Activity Test

Test compound: Compound No. 6
Test microbial strain: Malassezia pachydermatis (IFM56528)

The Malassezia microbe (Malassezia pachydermatis) cultured for 5 to 7 days in a Sabouraud medium (1% peptone, 4% dextrin, 1.5% agar) was suspended in physiological saline, and a suspension thereof was prepared in such a way as to have an absorbance of 0.025 at 600 nm. Thereto, the test compound dissolved in DMSO was added in such a way as to provide a final concentration of 70, 65, 64, 60, 55, 45, 40, 35, 32, 20, 18, or 8 ppm, and after 1 minute, 10 μL of the suspension and 10 ml of physiological saline were placed in a syringe and stirred, and the syringe was connected to a 37 mm Quality Monitor (manufactured by Pall Corporation) followed by filtration and washing. The membrane filter was impregnated as it was with the Sabouraud medium and subjected to culturing at 32° C. for 72 hours, the presence or absence of colony growth was investigated, and the concentration at which there was no colony growth was determined as the minimum fungicidal concentration (MFC100). When there was colony growth, the number of colonies formed there (the number of colonies in the inventive plot) and the number of colonies in a solvent to which the test compound was not added (the number of colonies in the non-agent treated plot) were measured, the colony formation inhibition rate (%) was determined according to the following expression, and the concentration showing a colony formation inhibition rate of 90% was determined as the 90% fungicidal concentration (MFC90), and the concentration showing a colony formation inhibition rate of 50% was determined as half fungicidal concentration (MFC50). Results thereof are shown in Table 8.

Colony formation inhibition rate (%)=[(number of colonies in non-agent treated plot-number of colonies in inventive plot)/number of colonies in non-agent treated plot]×100

Table 8

TABLE 8

| Microbial species | | Minimum fungicidal concentration |
|---|---|---|
| M. pachydermatis | MFC100 | 40 ppm |
| | MFC90 | 20 ppm |
| | MFC50 | 8 ppm |

Test Example 10-2: Antifungal Activity Test

Test compound: Compound No. 1
Test microbial strain: Malassezia pachydermatis (IFM56528)

The Malassezia microbe (Malassezia pachydermatis) cultured for 5 to 7 days in a Sabouraud medium (1% peptone, 4% dextrin, 1.5% agar) was suspended in physiological saline, and a suspension thereof was prepared in such a way as to have an absorbance of 0.025 at 600 nm. Thereto, the test compound dissolved in DMSO was added in such a way as to provide a final concentration of 500, 250, 200, 190, 180, 170, 160, 150, 140, 130, 125, 120, 110, 100, 90, 80, 70, or 64 ppm, and after 1 minute, 10 μL of the suspension and 10 mL of physiological saline were placed in a syringe and stirred, and the syringe was connected to a 37 mm Quality Monitor (manufactured by Pall Corporation) followed by filtration and washing. The membrane filter was impregnated as it was with the Sabouraud medium and subjected to culturing at 32° C. for 72 hours, the presence or absence of colony growth was investigated, and the concentration at which there was no colony growth was determined as the minimum fungicidal concentration (MFC100). When there was colony growth, the number of colonies formed there (the number of colonies in the inventive plot) and the number of colonies in a solvent to which the test compound was not added (the number of colonies in the non-agent treated plot) were measured, the colony formation inhibition rate (%) was determined according to the following expression, and the concentration showing a colony formation inhibition rate of 90% was determined as the 90% fungicidal concentration (MFC90), and the concentration showing a colony formation inhibition rate of 50% was determined as half fungicidal concentration (MFC50). Results thereof are shown in Table 9.

Colony formation inhibition rate (%)=[(number of colonies in non-agent treated plot-number of colonies in inventive plot)/number of colonies
in non-agent treated plot]×100

Table 9

TABLE 9

| Microbial species | | Fungicidal concentration |
|---|---|---|
| *Malassezia pachydermatis* | MFC100 | 160 ppm |
| | MFC90 | 130 ppm |
| | MFC50 | 64 ppm |

Test Example 11: Antifungal Activity Test

Test compounds: Compound No. 1 and Compound No. 6
Test microbial strain: *Malassezia pachydermatis* (IFM56528)

The *Malassezia* microbe (*Malassezia pachydermatis*) cultured for 5 to 7 days in a Sabouraud dextrose medium (1% peptone, 4% dextrose) was suspended in physiological saline and a *Malassezia* microbe suspension was prepared in such a way as to have an absorbance of 0.0025 at 600 nm. The *Malassezia* microbe suspension was placed in a 96-well plate at 190 μL/well, and 10 μL of the test compound dissolved in DMSO was added thereto in such a way as to provide a final concentration of 500, 250, 125, 62.5, 31.25, 16, 8, 4, 2, 1, or 0.5 ppm, and the 96-well plate was subjected to culturing at 32° C. for 72 hours. After culturing, 20 μL each of WST-8 (viable cell counting reagent, manufactured by Nacalai Tesque, Inc.) was added, and the 96-well plate was kept warm at 32° C. for 5 hours to develop a color. The absorbance at 450 nm was measured using a microplate reader (SpectraMax M2, manufactured by Molecular Devices, LLC). The absorbance of a well to which the test compound was added (absorbance in the inventive plot) and the absorbance of a well in the solvent to which the test compound was not added (absorbance in the non-agent treated plot) were measured, the viability (%) of the *Malassezia* microbe was determined according to the following expression, and the agent concentration at which the viability was 0% was defined as the minimum inhibitory concentration (MIC100). Further, the agent concentration at which the viability was 50% was defined as the half inhibitory concentration (MIC50). Results thereof are shown in Table 10.

Viability of *Malassezia* microbe (%)=[(absorbance in non-agent treated plot-absorbance in inventive plot)/absorbance in non-agent treated plot]×100

Table 10

TABLE 10

| Microbial species | | Inhibitory concentration | |
|---|---|---|---|
| | | Compound No. 1 | Compound No. 6 |
| *M. pachydermatis* | MIC100 | 16 ppm | 4 ppm |
| | MIC90 | 16 ppm | 4 ppm |
| | MIC50 | 8 ppm | 2 ppm |

The invention claimed is:

1. A method for ameliorating a symptom or a disease caused by a microbe in a non-human animal, comprising administering an effective amount of an antimicrobial agent to the non-human animal, wherein the antimicrobial agent comprises a compound represented by formula (I) or (II) or a salt thereof

[Formula 1]

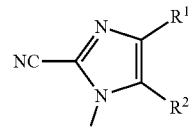

(I)

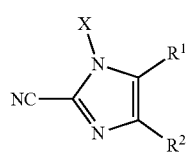

(II)

wherein
R¹ and R² are each independently
a hydrogen atom,
a halogen atom, or
a phenyl group optionally substituted with at least one group of an alkyl group having 1 to 6 carbon atoms and a halogen atom;
X is a hydrogen atom or a hydroxyl group.

2. The method of claim 1, wherein R¹ and R² are different groups from each other.

3. The method of claim 1, wherein
the compound represented by formula (I) or (II) is selected from
5-chloro-4-(4-methylphenyl)-1H-imidazole-2-carbonitrile,
4-(4-methylphenyl)-1H-imidazole-2-carbonitrile,
5-chloro-4-(3-methylphenyl)-1H-imidazole-2-carbonitrile,
5-chloro-4-(2-methylphenyl)-1H-imidazole-2-carbonitrile,
5-chloro-4-(2-chloro-4-methylphenyl)-1H-imidazole-2-carbonitrile,
5-chloro-4-(3-chloro-4-methylphenyl)-1H-imidazole-2-carbonitrile,
5-chloro-4-(4-chloro-3-methylphenyl)-1H-imidazole-2-carbonitrile,
4-(2-chloro-4-methylphenyl)-1H-imidazole-2-carbonitrile,
5-chloro-1-hydroxy-4-(4-methylphenyl)-imidazole-2-carbonitrile, and
4-chloro-1-hydroxy-5-(4-methylphenyl)-imidazole-2-carbonitrile.

4. The method of claim 1, wherein the microbe is a fungus.

5. The method of claim 4, wherein the fungus is at least one selected from a microbe belonging to the genus *Malassezia*, a microbe belonging to the genus *Microsporum*, and a microbe belonging to the genus *Arthroderma*.

6. The method of claim 4, wherein the symptom or disease is a skin disease.

7. The method of claim 6, wherein the symptom or disease is tinea versicolor, folliculitis, seborrheic dermatitis, psoriasis vulgaris, atopic dermatitis, dermatophytosis, or otitis externa.

8. The method of claim 1, wherein the microbe is a bacterium.

9. The method of claim 8, wherein the bacterium is at least one selected from a microbe belonging to the genus *Staphylococcus*, a microbe belonging to the genus *Streptococcus*, a microbe belonging to the genus *Pasteurella*, a microbe belonging to the genus *Escherichia*, a microbe belonging to the genus Pseudomonaceae, a microbe belonging to the genus *Proteus*, and a microbe belonging to the genus *Klebsiella*.

10. The method of claim 8, wherein the symptom or disease is a skin disease.

11. The method of claim 10, wherein the symptom or disease is pyoderma or otitis externa.

12. The method of claim 1, wherein the non-human animal is a dog, a cat, or a horse.

\* \* \* \* \*